US012594844B2

(12) United States Patent
Yamaguchi et al.

(10) Patent No.:    US 12,594,844 B2
(45) Date of Patent:        Apr. 7, 2026

(54) ELECTRIC WORK VEHICLE

(71) Applicant: KUBOTA CORPORATION, Osaka (JP)

(72) Inventors: Tatsuya Yamaguchi, Sakai (JP); Norio Obata, Sakai (JP); Yasuaki Morioka, Sakai (JP); Haruki Mitsui, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 319 days.

(21) Appl. No.: 18/569,931

(22) PCT Filed: May 17, 2022

(86) PCT No.: PCT/JP2022/020483
§ 371 (c)(1),
(2) Date: Dec. 13, 2023

(87) PCT Pub. No.: WO2023/276471
PCT Pub. Date: Jan. 5, 2023

(65) Prior Publication Data
US 2024/0286495 A1      Aug. 29, 2024

(30) Foreign Application Priority Data
Jun. 29, 2021    (JP) ................................. 2021-107500

(51) Int. Cl.
*B60L 50/64*        (2019.01)
*B60L 50/60*        (2019.01)

(52) U.S. Cl.
CPC ............... *B60L 50/64* (2019.02); *B60L 50/66* (2019.02); *B60L 2200/40* (2013.01)

(58) Field of Classification Search
CPC .. B60L 50/64; B60L 50/66; B60K 2001/0411; B62D 25/10; B62D 25/105; B62D 25/12
See application file for complete search history.

(56) References Cited

U.S. PATENT DOCUMENTS

| | | | | | |
|---|---|---|---|---|---|
| 5,901,803 | A | * | 5/1999 | Harada | B62D 25/12 |
| | | | | | 180/69.2 |
| 6,030,029 | A | * | 2/2000 | Tsuda | B62D 25/10 |
| | | | | | 296/203.02 |
| 8,100,212 | B2 | * | 1/2012 | Sawai | B62D 25/14 |
| | | | | | 180/69.2 |
| 9,499,045 | B2 | * | 11/2016 | Sawai | B60K 13/04 |

(Continued)

FOREIGN PATENT DOCUMENTS

| | | |
|---|---|---|
| JP | 2020079085 A | 5/2020 |
| JP | 2021-000953 A | 1/2021 |
| JP | 2021000955 A | 1/2021 |

OTHER PUBLICATIONS

Official Communication issued in International Patent Application No. PCT/JP2022/020483, mailed on Aug. 2, 2022.

*Primary Examiner* — Jeffrey J Restifo
(74) *Attorney, Agent, or Firm* — Keating & Bennett, LLP

(57)            ABSTRACT

An electric work vehicle includes a battery, a motor to be driven by electric power supplied from the battery, a cover covering the battery, and a support portion supported by the battery. The cover is supported by the support portion and swingable about a horizontal axis relative to the support portion to enable opening and closing, and the support portion is supported by a side portion of the battery.

7 Claims, 7 Drawing Sheets

(56)                References Cited

U.S. PATENT DOCUMENTS

| | | | | |
|---|---|---|---|---|
| 10,029,731 | B2 * | 7/2018 | Matsumoto | H01M 50/249 |
| 10,214,247 | B2 * | 2/2019 | Watabe | B62D 25/12 |
| 10,377,425 | B2 * | 8/2019 | Aoyama | B60Q 1/18 |
| 10,449,851 | B2 * | 10/2019 | Takii | F01N 13/008 |
| 11,925,131 | B2 * | 3/2024 | Nakayama | B60K 1/04 |
| 12,036,856 | B2 * | 7/2024 | Tottori | B60K 1/04 |
| 12,157,360 | B2 * | 12/2024 | Tottori | B60K 11/02 |
| 12,409,740 | B2 * | 9/2025 | Okazaki | B60K 1/04 |
| 2022/0234434 | A1 * | 7/2022 | Tottori | B60L 58/26 |
| 2022/0379703 | A1 * | 12/2022 | Tottori | B60K 11/06 |
| 2022/0379704 | A1 * | 12/2022 | Tottori | B60K 1/04 |
| 2023/0159109 | A1 * | 5/2023 | Nagata | B62D 25/082 |
| | | | | 180/69.2 |
| 2024/0270318 | A1 * | 8/2024 | Miyazaki | E02F 9/207 |
| 2024/0286495 | A1 * | 8/2024 | Yamaguchi | B60L 50/66 |
| 2024/0326611 | A1 * | 10/2024 | Okazaki | B60L 50/51 |
| 2024/0326618 | A1 * | 10/2024 | Okazaki | B60L 58/26 |
| 2025/0010735 | A1 * | 1/2025 | Ono | B60K 15/05 |
| 2025/0153582 | A1 * | 5/2025 | Ono | B60K 11/08 |
| 2025/0282235 | A1 * | 9/2025 | Miyazaki | B60L 50/66 |
| 2025/0286321 | A1 * | 9/2025 | Miyazaki | B60L 15/20 |
| 2025/0289333 | A1 * | 9/2025 | Yamaguchi | B60L 53/16 |

* cited by examiner

ELECTRIC WORK VEHICLE

BACKGROUND OF THE INVENTION

1. Field of the Invention

The present invention relates to an electric work vehicle including a battery, a motor configured to be driven by electric power supplied from the battery, and a travel device configured to be driven by the motor.

2. Description of the Related Art

The electric work vehicle described in JP 2021-953A is known as an example of the above-described electric work vehicle. The electric work vehicle (a "tractor" in JP 2021-953A) includes a cover covering a battery (a "travel battery" in JP 2021-953A). The cover is configured to enable opening and closing by swinging about a horizontal axis (an "opening and closing axis" in JP 2021-953A).

SUMMARY OF THE INVENTION

JP 2021-953A dose not specifically describe a support structure of the cover. Here, for example, a configuration can be envisaged in which a support frame extending in an up-down direction is provided rearward of the battery, and the cover is supported at an upper end portion of the support frame while being swingable about the horizontal axis.

However, this configuration requires that a relatively large space be secured rearward of the battery in order to provide a support frame that is sufficiently robust to stably support the cover. This tends to reduce the size of the battery that can be mounted in the work vehicle. Consequently, the capacity of the battery tends to be reduced.

Preferred embodiments of the present invention provide electric work vehicles that do not require a space to be secured rearward of a battery in order to install a support frame that supports a cover, and that enable the cover to be stably supported.

According to a preferred embodiment of the present invention, an electric work vehicle includes a battery, a motor to be driven by electric power supplied from the battery, a cover covering the battery, and a first support portion supported by the battery, wherein the cover is supported by the first support portion and is swingable about a horizontal axis relative to the first support portion to enable opening and closing, and the first support portion is supported by a side portion of the battery.

With this configuration, the cover is supported by the first support portion supported by a side portion of the battery. Accordingly, a support frame that supports the cover need not be provided rearward of the battery. In addition, the battery can be located closer to the operator portion, and it is therefore possible to secure a large space to install the battery. Accordingly, it is possible to increase the size and capacity of the battery, and also to achieve an improved layout.

In general, a side portion of a battery is more robust and resistant to a force acting vertically downward than a top plate portion of the battery. Also, with this configuration, the cover is supported by a side portion of the battery via the first support portion. Accordingly, the cover can be stably supported as compared with a configuration in which the cover is supported by the top plate portion of the battery.

Therefore, with this configuration, a space to install the support frame that supports the cover need not be secured rearward of the battery, and it is possible to realize an electric work vehicle that enables the cover to be stably supported.

Furthermore, the electric work vehicle may further include a second support portion attached to the side portion of the battery and the first support portion is supported by the side portion of the battery via the second support portion.

With this configuration, a configuration in which the cover is supported by a side portion of the battery is readily realized in a reliable manner, using a relatively simple structure. Therefore, with this configuration, a space to install the support frame to support the cover need not be secured rearward of the battery, and an electric work vehicle that enables the cover to be stably supported can be easily and reliably realized using a relatively simple structure.

Furthermore, the second support portion may be attached to a hanging portion on the side portion of the battery to hang the battery.

In general, a hanging portion to hang a battery has high strength. Therefore, with this configuration, the second support portion is stably supported. Thus, the cover is stably supported.

Furthermore, the second support portion may have a gate shape straddling an upper end surface of the battery, a lower end portion of the second support portion may be attached to the side portion of the battery, and a gap may be provided between the upper end surface of the battery and the second support portion.

With this configuration, a gap is provided between an upper end surface of the battery and the second support portion, and, therefore, no load is exerted on the upper end surface of the battery from the second support portion. Accordingly, it is possible to prevent the load of the cover from being exerted on the upper end surface of the battery via the second support portion.

Moreover, with this configuration, a situation where the second support portion impedes heat dissipation from the upper end surface of the battery is less likely to occur than with a configuration in which the upper end surface of the battery and the second support portion are in contact with each other. That is, with this configuration, heat dissipation from the battery is likely to suitably occur.

Furthermore, the electric work vehicle may further include a stepped portion on the side portion of the battery and the second support portion may be attached to the stepped portion.

With this configuration, the second support portion is supported by the stepped portion, which tends to have relatively high strength. Accordingly, the side portion of the battery receives, in a direction in which its strength is secured, a force exerted from above. Therefore, the second support portion is stably supported. Thus, the cover is stably supported.

Furthermore, the electric work vehicle may further include an operator portion where an operator is capable of riding, and a third support portion between the operator portion and the battery, wherein the third support portion supports an electric component of the operator portion and may be supported by the battery.

With this configuration, an electric component of the operator portion is supported by the battery via the third support portion. Thus, the electric component of the operator portion is likely to be stably supported.

Furthermore, the electric work vehicle may further include an operator portion where an operator is capable of riding, and a third support portion between the operator portion and the battery, wherein the third support portion supports an electric component of the operator portion and is supported by the battery, and the second support portion and the third support portion are coupled to each other.

With this configuration, the second support portion and the third support portion are reinforced by each other as a result of the second support portion and the third support portion being coupled to each other. Thus, the cover and the electric component of the operator portion are stably supported.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described with reference to the drawings. In the following description, the arrow F shown in FIGS. 1, 2, 5, and 6 indicates the "forward direction", the arrow B indicates the "rearward direction", the arrow L shown in FIGS. 3 to 7 indicates the "leftward direction", and the arrow R indicates the "rightward direction". The arrow U shown in FIGS. 1 to 4, 6, and 7 indicates the "upward direction", and the arrow D indicates the "downward direction".

Figure 1:
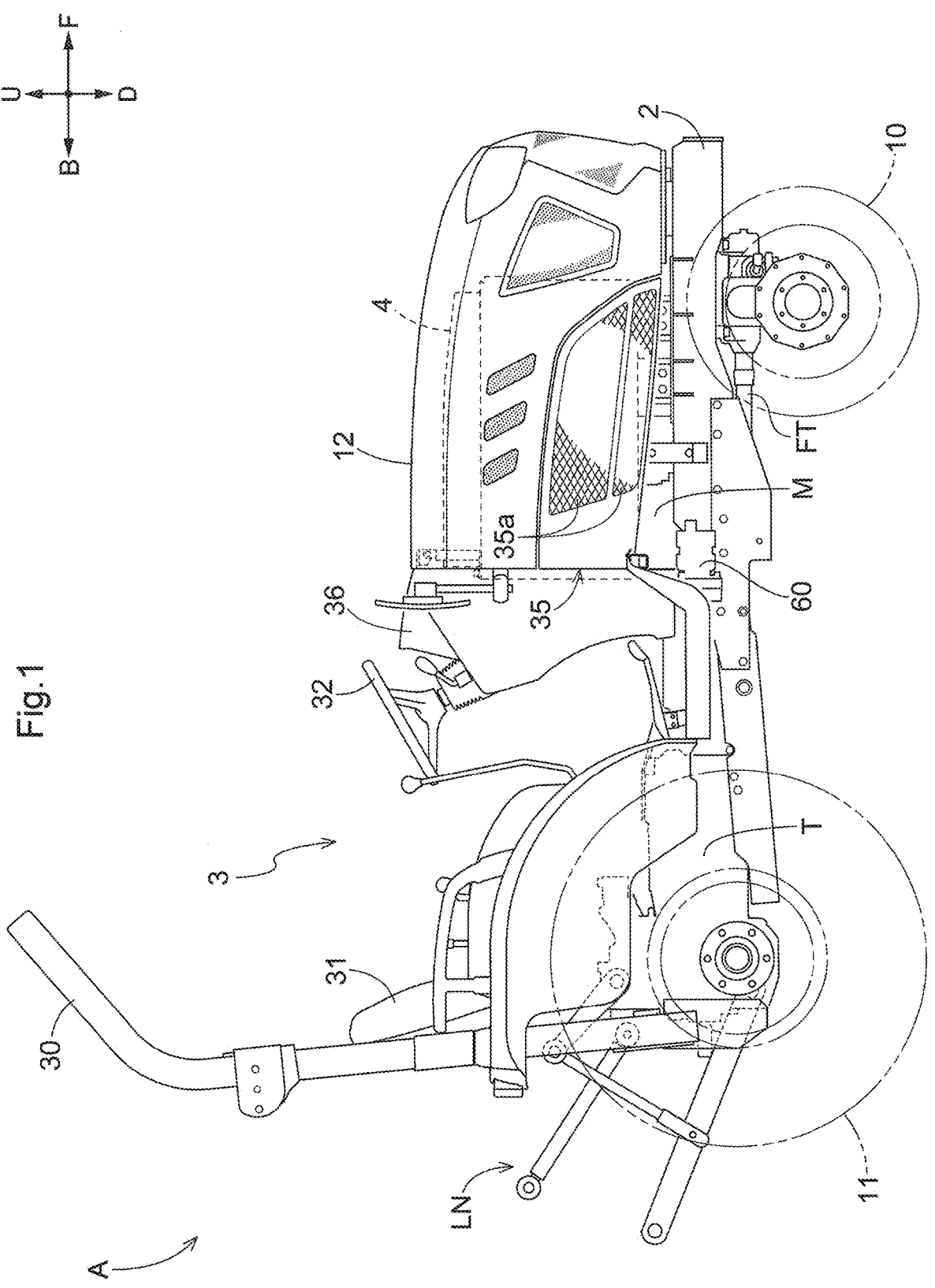
FIG. 1 is a right side view of a tractor.

As shown in FIG. 1, a tractor A (corresponding to an "electric work vehicle") includes left and right front wheels 10 (each corresponding to a "travel device"), left and right rear wheels 11 (each corresponding to a "travel device"), and a cover 12.

In addition, the tractor A includes a body frame 2 and an operator portion 3.

The body frame 2 is supported by the left and right front wheels 10 and the left and right rear wheels 11.

The cover 12 is disposed at a front portion of the body. Also, the operator portion 3 is provided rearward of the cover 12.

The operator portion 3 includes a protection frame 30, a driver's seat 31, and a steering wheel 32. An operator can sit on the driver's seat 31. This enables the operator to ride in the operator portion 3. The left and right front wheels 10 can be steered by operating the steering wheel 32. The operator can perform various driving operations in the operator portion 3.

That is, the tractor A includes an operator portion 3 configured to allow the operator to ride in the operator portion 3.

In addition, the tractor A includes a travel battery 4 (corresponding to a "battery"), a motor M, a transmission T, and a front transmission mechanism FT.

The cover 12 is configured to swing about an opening and closing axis Q (see FIG. 2) (corresponding to a "horizontal axis") extending in a left-right direction of the body. Thus, the cover 12 is configured to enable opening and closing. Also, while the cover 12 is closed, the travel battery 4 is covered by the cover 12. That is, the tractor A includes a cover 12 covering the travel battery 4. Also, the travel battery 4 supplies electric power to the motor M.

The motor M is disposed below the travel battery 4. Also, the motor M is driven by the electric power supplied from the travel battery 4. The driving force of the motor M is transmitted to the transmission T.

The transmission T is on the rear side of the travel battery 4 and is disposed rearward of the motor M. The front transmission mechanism FT extends forward from the transmission T. The transmission T changes the speed of the driving force received from the motor M, and transmits the resulting driving force to the left and right rear wheels 11. The driving force is transmitted from the transmission T to the left and right front wheels 10 as well via the front transmission mechanism FT. Thus, the left and right front wheels 10 and the left and right rear wheels 11 are driven.

That is, the tractor A includes the travel battery 4, and a motor M configured to be driven by the electric power supplied from the travel battery 4. In addition, the tractor A includes left and right front wheels 10 and left and right rear wheels 11 that are configured to be driven by the motor M.

As shown in FIG. 1, a link mechanism LN is provided at a rear section of the tractor A. For example, a work device (not shown) such as a cultivator device can be coupled to the link mechanism LN.

The transmission T is configured to transmit, to the work device, some of the driving force received from the motor M. Thus, the work device is driven.

With the above-described configuration, the tractor A can perform work using the work device while traveling using the left and right front wheels 10 and the left and right rear wheels 11.

As shown in FIG. 1, the tractor A also includes hydraulic pump 60. The hydraulic pump 60 is provided on a right side portion of the body. The hydraulic pump 60 is driven by the driving force from the motor M. Also, the hydraulic pump 60 supplies a hydraulic fluid to various portions of the body.

Left and right side covers 35 are provided at a front portion of the body of the tractor A. Each side cover 35 includes a grille 35a through which air can pass. A lower left rear portion and a lower right rear portion of the cover 12 are cut out conforming to outer shapes of the side covers 35.

Figure 2:
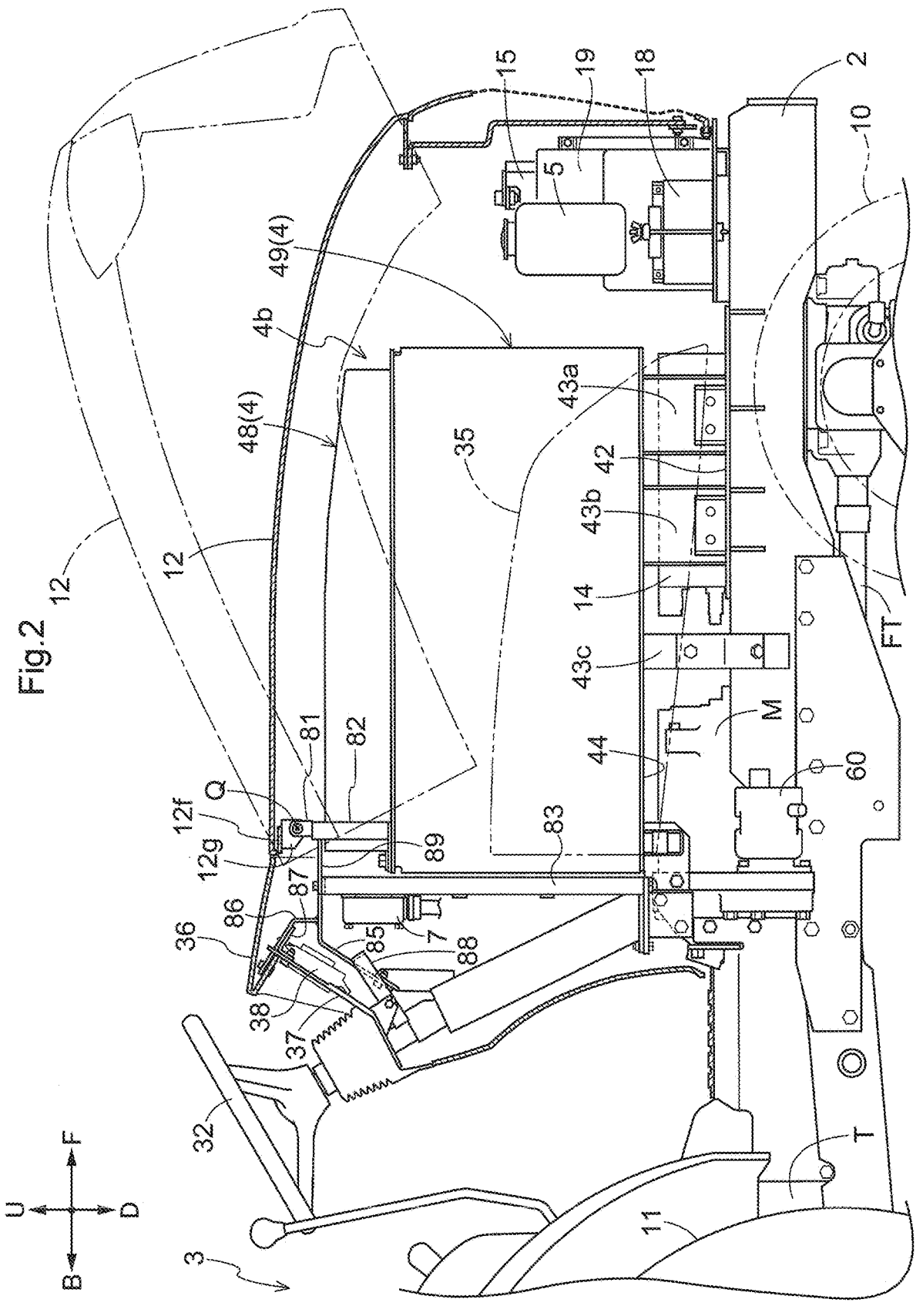
FIG. 2 is a partially cutaway right side view showing configurations of a cover and so forth.

As shown in FIG. 2, the tractor A includes a reserve tank 5, an inverter 14, a radiator 15, an auxiliary device battery 18, and a voltage converter 19. While the cover 12 is closed, the reserve tank 5, the radiator 15, the auxiliary device battery 18, and the voltage converter 19 are covered by the cover 12.

The inverter 14 is disposed below the travel battery 4. The inverter 14 converts direct-current power supplied from the travel battery 4 into alternating-current power, and supplies the alternating-current power to the motor M.

The reserve tank 5 can store cooling water.

The radiator 15 and a water pump (not shown) are provided on a cooling water path of the tractor A. As a result of the water pump pumping cooling water, the cooling water is circulated along the cooling water path. Then, the cooling water is cooled by passing through the radiator 15.

The auxiliary device battery 18 supplies electric power to various types of auxiliary devices. Also, electric power is transmitted from the travel battery 4 to the voltage converter 19. The voltage converter 19 steps down the electric power supplied from the travel battery 4, and supplies the resulting electric power to the auxiliary device battery 18.

As shown in FIG. 2, the travel battery 4 and the inverter 14 are supported by the body frame 2.

More specifically, as shown in FIG. 2, an inverter support portion 42 is supported by the body frame 2. The inverter support portion 42 is a horizontally oriented plate-shaped member. The inverter 14 is placed on the inverter support portion 42.

As shown in FIG. 2, a first support frame 43*a* and a second support frame 43*b* are supported by the inverter support portion 42. A third support frame 43*c* is supported by the body frame 2. Also, a battery support portion 44 is supported by the first support frame 43*a*, the second support frame 43*b*, and the third support frame 43*c*. The battery support portion 44 is a horizontally oriented plate-shaped structure. In addition, the battery support portion 44 extends across left and right ends of the travel battery 4. The travel battery 4 is placed on the battery support portion 44.

The reserve tank 5, the radiator 15, the auxiliary device battery 18, and the voltage converter 19 are also supported by the body frame 2.

Figure 3:
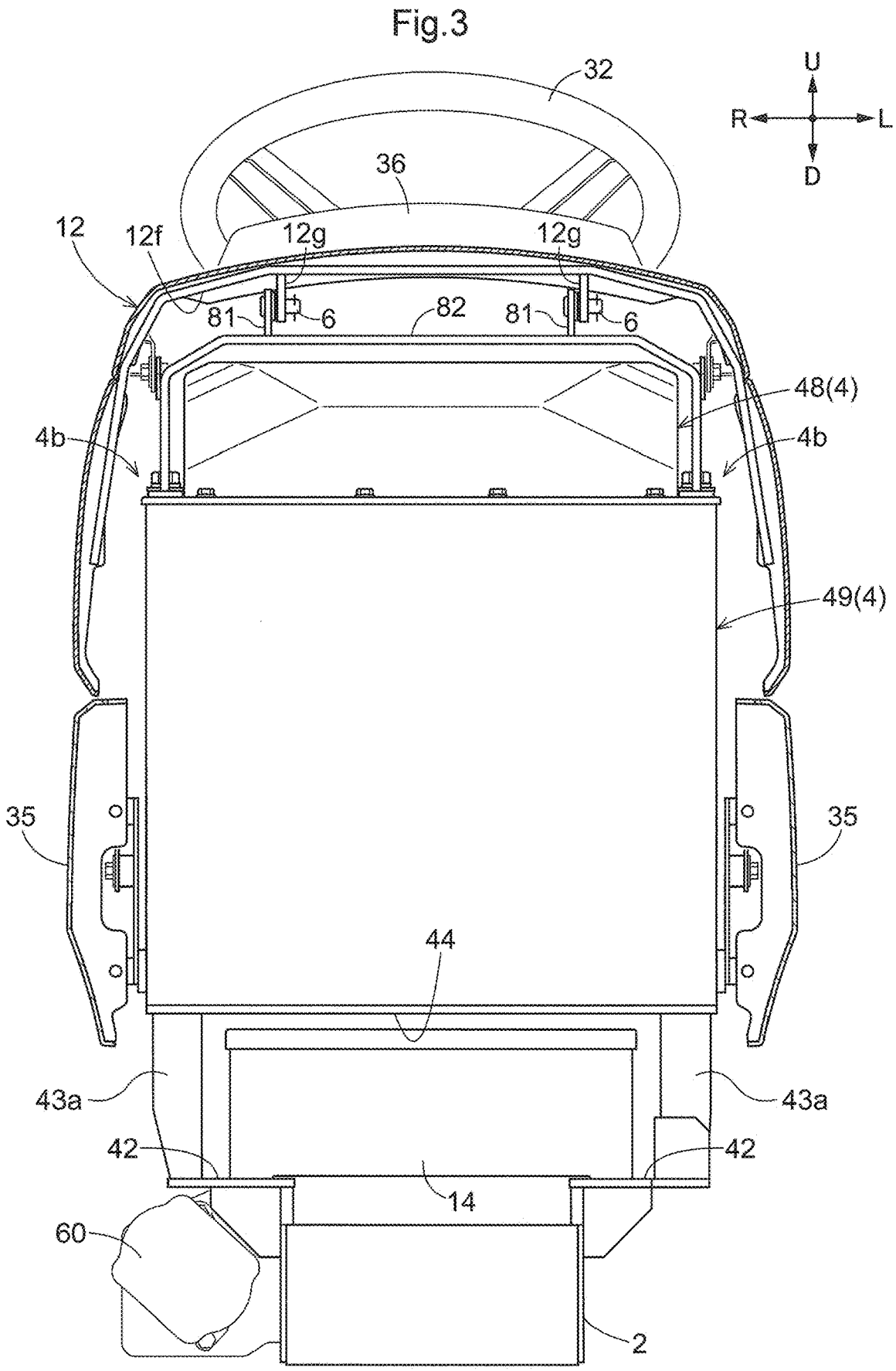
FIG. 3 is a partially cutaway front view showing configurations of a travel battery and so forth.

As shown in FIGS. 2 and 3, the travel battery 4 includes an upper battery portion 48 and a lower battery portion 49. The upper battery portion 48 is located above the lower battery portion 49.

As shown in FIG. 2, the length of the lower battery portion 49 in the front-rear direction is longer than the length of the upper battery portion 48 in the front-rear direction. As shown in FIG. 3, the length of the lower battery portion 49 in the left-right direction is longer than the length of the upper battery portion 48 in the left-right direction. Therefore, as shown in FIGS. 2 and 3, a stepped portion 4*b* is located between the upper battery portion 48 and the lower battery portion 49.

The stepped portion 4*b* extends all the way around the travel battery 4. In other words, the stepped portion 4*b* extends across front, rear, left, and right side portions of the travel battery 4.

In this manner, the stepped portion 4*b* is provided at side portions of the travel battery 4.

Figure 4:
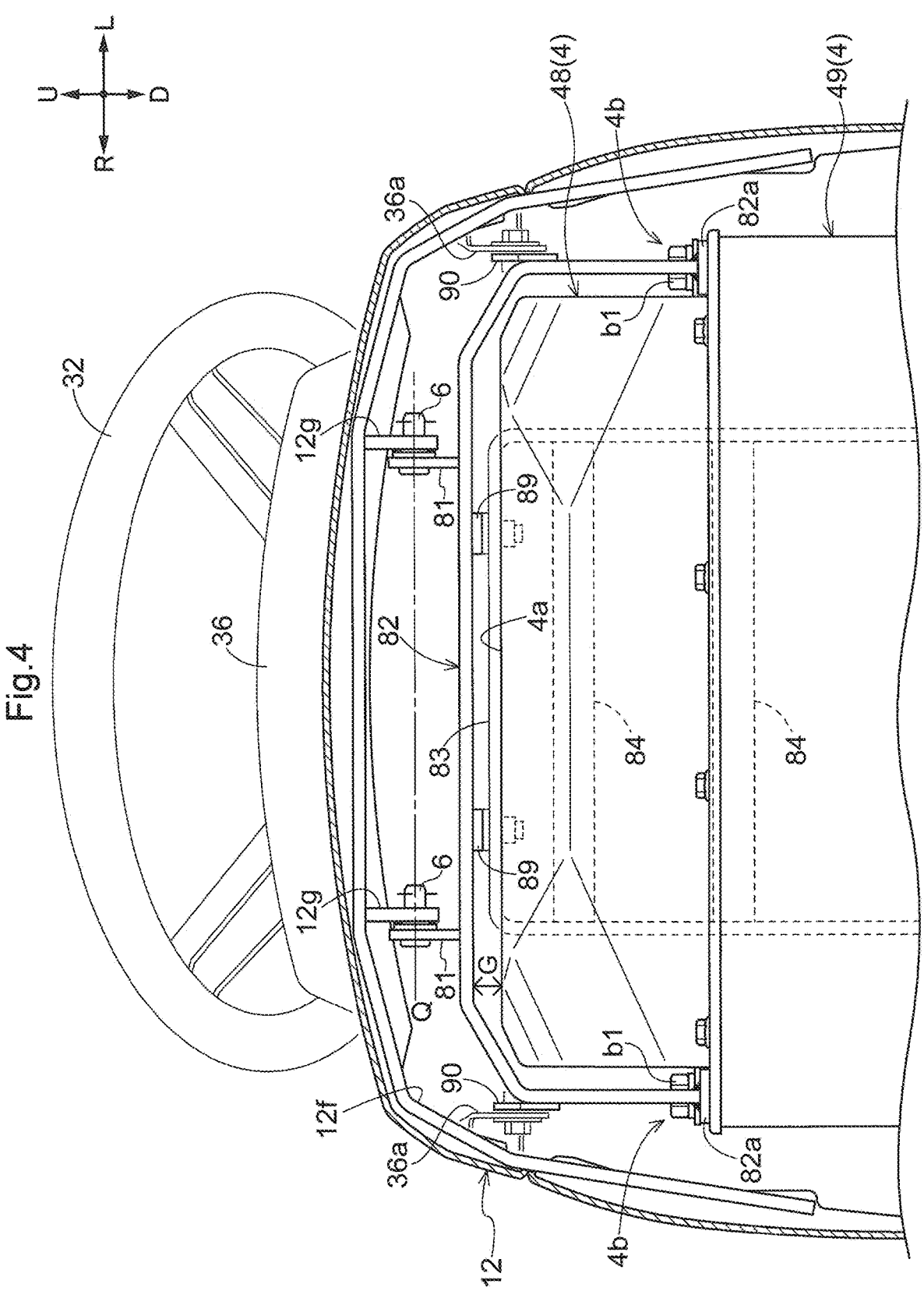
FIG. 4 is a partially cutaway front view showing configurations of a first support portion and so forth.

As shown in FIGS. 3 and 4, the cover 12 includes a frame portion 12*f* having a gate shape in a front view, and at least one coupling portion 12*g*. The frame portion 12*f* is provided on the inner wall side of the cover 12. The coupling portion 12*g* protrudes downward from a lower surface of an upper end portion of the frame portion 12*f*.

In the present preferred embodiment, two coupling portions 12*g* are provided, for example. However, the present invention is not limited thereto, and one coupling portion 12*g*, or three or more coupling portions 12*g* may be provided.

As shown in FIGS. 3 and 4, the tractor A includes at least one first support portion 81 and a second support portion 82.

Figure 5:
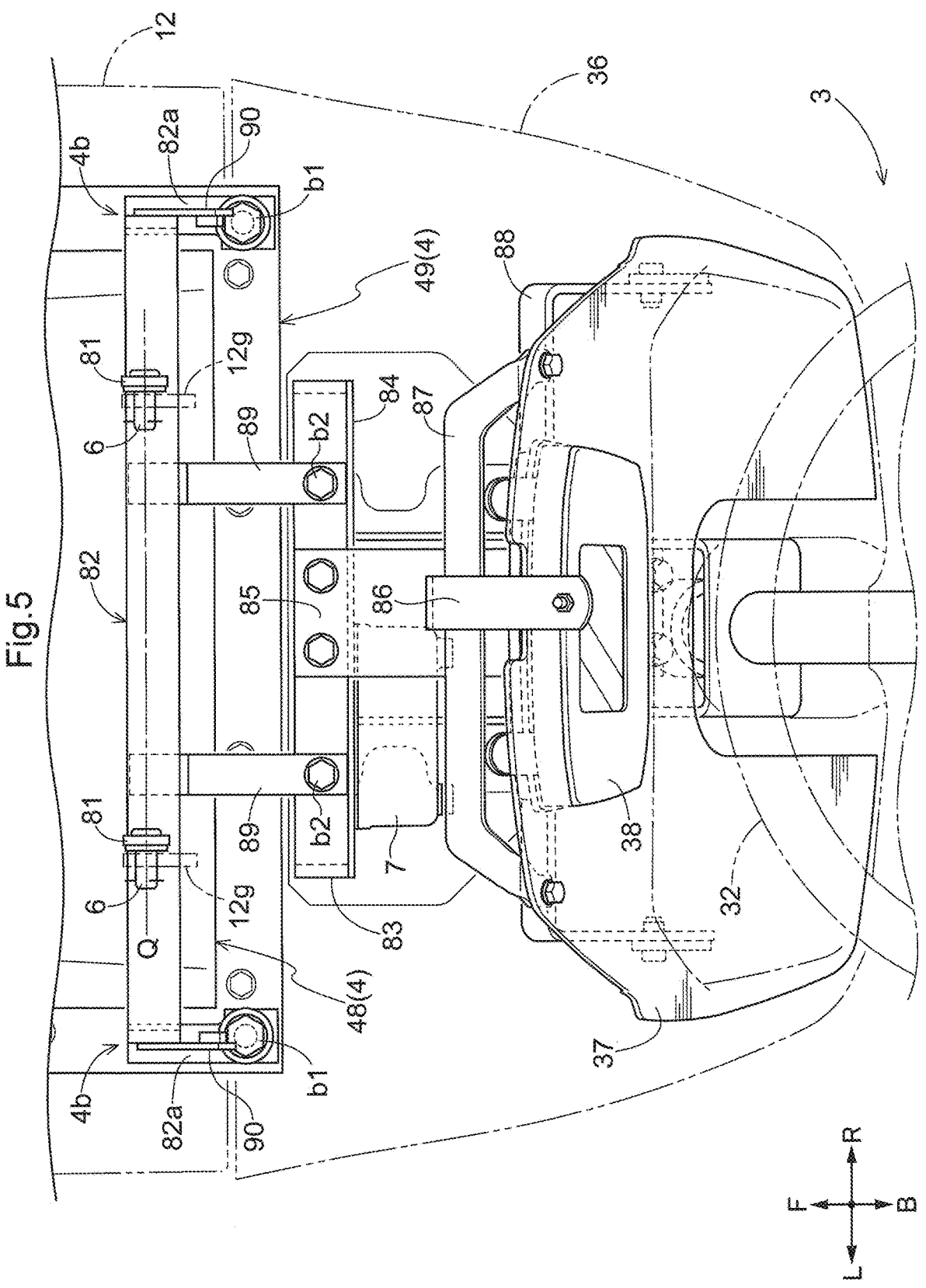
FIG. 5 is a plan view showing configurations of the first support portion and so forth.
Figure 6:
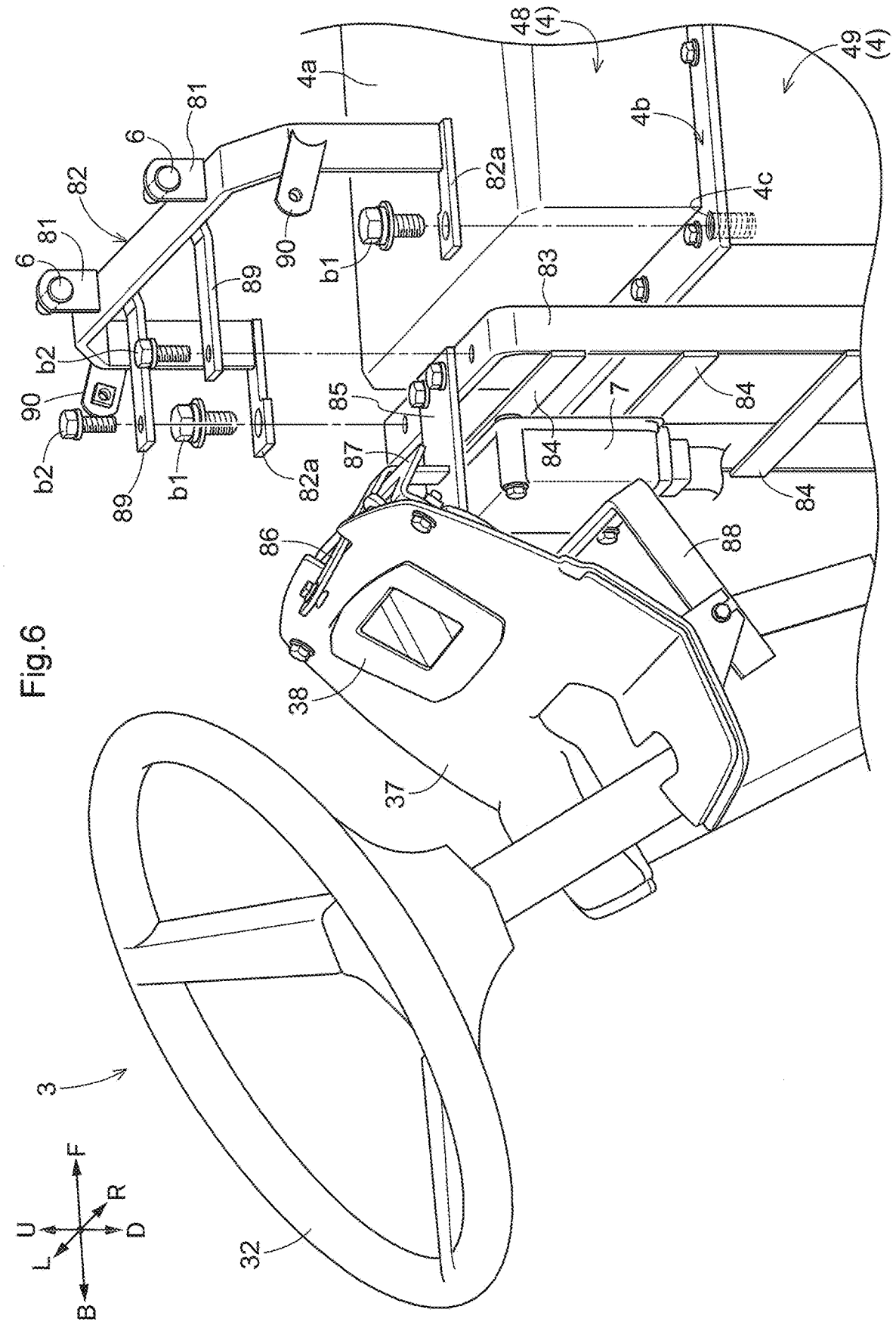
FIG. 6 is an exploded perspective view showing an attachment structure of a second support portion.

As shown in FIGS. 4 to 6, the second support portion 82 has a gate shape straddling an upper end surface 4*a* of the travel battery 4. As shown in FIG. 4, a gap G is provided between the upper end surface 4*a* of the travel battery 4 and the second support portion 82. The second support portion 82 is attached to the stepped portion 4*b*.

More specifically, as shown in FIG. 6, the stepped portion 4*b* is provided with at least one hanging portion 4*c*. The hanging portion 4*c* includes a bolt hole used to hang the travel battery 4. Although FIG. 6 shows a hanging portion 4*c* located in a rear right portion of travel battery 4, hanging portions 4*c* are also provided in a front right portion, a front left portion, and a rear left portion of the travel battery 4.

Attachment portions 82*a* are provided at left and right lower end portions, respectively, of the second support portion 82. Each attachment portion 82*a* has a horizontally oriented plate shape.

As shown in FIG. 6, the right attachment portion 82*a* is attached, using a first bolt b1, to the hanging portion 4*c* provided in the rear right portion of the travel battery 4. The left attachment portion 82*a* is attached, using a first bolt b1, to the hanging portion 4*c* provided in the rear left portion of the travel battery 4.

That is, the second support portion 82 is attached to the hanging portions 4*c* to hang the travel battery 4 that are provided on side portions of the travel battery 4. With the above-described configuration, lower end portions of the second support portion 82 are attached to side portions of the travel battery 4.

In this manner, the tractor A includes a second support portion 82 attached to side portions of the travel battery 4.

As shown in FIGS. 4 to 6, each first support portion 81 extends upward from an upper surface of an upper end portion of the second support portion 82. That is, the first support portions 81 are supported by side portions of the travel battery 4 via the second support portion 82.

In the present preferred embodiment, two first support portions 81 are provided. However, the present invention is not limited thereto, and one first support portion 81, or three or more first support portions 81 may be provided.

In this manner, the tractor A includes at least one first support portion 81 supported by the travel battery 4. Also, the first support portion 81 is supported by a side portion of the travel battery 4.

As shown in FIGS. 4 and 5, the right first support portion 81 and the right coupling portion 12*g* are coupled to each other via a pin 6 while being rotatable about the opening and closing axis Q relative to each other. Also, the left first support portion 81 and the left coupling portion 12*g* are coupled to each other via a pin 6 while being rotatable about the opening and closing axis Q relative to each other.

Thus, the cover 12 is supported by the left and right first support portions 81 while being swingable about the opening and closing axis Q relative to the left and right first support portions 81.

That is, the cover 12 is supported by the first support portions 81 while being swingable about the opening and closing axis Q relative to the first support portions 81, and is configured to enable opening and closing by swinging about the opening and closing axis Q.

As shown in FIGS. 2, 5, and 6, a panel 37 and a display device 38 (corresponding to an "electric component") are provided at a front portion of the operator portion 3. The display device 38 is attached to the panel 37. The display device 38 can display various types of information.

As shown in FIGS. 4 to 6, a third support portion 83 is provided between the operator portion 3 and the travel battery 4. As shown in FIG. 2, the third support portion 83 is supported by the body frame 2. The third support portion 83 extends in the up-down direction of the body. Also, as shown in FIGS. 4 to 6, the third support portion 83 has a gate shape.

In this manner, the tractor A includes a third support portion 83 provided between the operator portion 3 and the travel battery 4.

As shown in FIGS. 2, 5, and 6, a first support stay 85 is coupled to an upper surface of the third support portion 83. The first support stay 85 extends rearward from the third support portion 83.

In addition, a second support stay 86 extends upward from an upper surface of the first support stay 85. A third support stay 87 is coupled to an intermediate portion of the second support stay 86. The third support stay 87 extends in the left-right direction.

As shown in FIG. 2, a rear portion of the first support stay 85 extends downward and rearward. Also, a fourth support stay 88 is coupled to a rear portion of the first support stay 85. The fourth support stay 88 extends in the left-right direction. Left and right end portions of the fourth support stay 88 are bent downward and rearward.

An upper portion of the panel 37 is attached to a left end portion and a right end portion of the third support stay 87. A lower portion of the panel 37 is attached to a left end portion and a right end portion of the fourth support stay 88. That is, the panel 37 is supported by the third support portion 83 via the first support stay 85, the second support stay 86, the third support stay 87, and the fourth support stay 88.

With this configuration, the display device 38 is supported by the third support portion 83 via the panel 37, the first support stay 85, the second support stay 86, the third support stay 87, and the fourth support stay 88.

As shown in FIGS. 4 to 6, at least one coupling stay 89 extends rearward from the lower surface of the upper end portion of the second support portion 82. A rear end portion of the coupling stay 89 is coupled, using a second bolt b2, to an upper end portion of the third support portion 83. That is, the second support portion 82 is coupled to the third support portion 83 via the coupling stay 89.

In the present preferred embodiment, two left and right coupling stays 89 are provided. However, the present invention is not limited thereto, and one coupling stay 89, or three or more coupling stays 89 may be provided.

With this configuration, the second support portion 82 and the third support portion 83 are coupled to each other. In addition, the third support portion 83 is supported by the travel battery 4 via the coupling stays 89 and the second support portion 82.

That is, the third support portion 83 supports the display device 38 in the operator portion 3, and is supported by the travel battery 4.

As shown in FIGS. 4 to 6, a plurality of lateral frames 84 are attached to the third support portion 83. The lateral frames 84 extend in the left-right direction. The lateral frames 84 are attached to the third support portion 83 from the rear side.

An electronic control unit 7 is attached to a lateral frame 84. Thus, the electronic control unit 7 is supported by the third support portion 83 via the lateral frame 84. The electronic control unit 7 controls various components and portions of the tractor A.

As shown in FIGS. 2 and 5, the tractor A includes a front cover portion 36. The front cover portion 36 is located rearward of the cover 12. The front cover portion 36 covers the electronic control unit 7 and the third support portion 83. In addition, the front cover portion 36 covers an outer edge portion of the panel 37.

As shown in FIG. 4, two left and right inner attachment portions 36a are provided on the inner wall side of the front cover portion 36. As shown in FIGS. 4 to 6, cover attachment stays 90 are coupled to a left end portion and a right end portion, respectively, of the second support portion 82.

Each of the cover attachment stays 90 extends rearward and upward from the second support portion 82.

The left inner attachment portion 36a is attached to the left cover attachment stay 90. The right inner attachment portion 36a is attached to the right cover attachment stay 90.

With this configuration, the front cover portion 36 is supported by the travel battery 4 via the cover attachment stays 90 and the second support portion 82.

As shown in FIGS. 2 and 5, the front cover portion 36 is attached to an upper end portion of the second support stay 86. Thus, the front cover portion 36 is supported by the travel battery 4 via the second support stay 86, the first support stay 85, the third support portion 83, the coupling stays 89, and the second support portion 82.

With the above-described configuration, the cover 12 is supported by the first support portions 81 supported by side portions of the travel battery 4. Accordingly, a support frame to support the cover 12 need not be provided rearward of the travel battery 4. In addition, the travel battery 4 can be disposed closer to the operator portion 3, and it is therefore possible to secure a large space to install the travel battery 4. Accordingly, it is possible to increase the size and capacity of the travel battery 4, and also to achieve an improved layout.

In general, a side portion of a battery such as the travel battery 4 is more robust and resistant to a force acting vertically downward than a top plate portion of the battery. Also, with the above-described configuration, the cover 12 is supported by side portions of the travel battery 4 via the first support portions 81. Accordingly, the cover 12 can be stably supported as compared with a configuration in which the cover 12 is supported by a top plate portion of the travel battery 4.

Therefore, with the above-described configuration, a space to install the support frame to support the cover 12 need not be secured rearward of the travel battery 4, and it is possible to realize a tractor A that enables the cover 12 to be stably supported.

Other Preferred Embodiments

The tractor A may be configured as a hybrid tractor including an engine.

Figure 7:
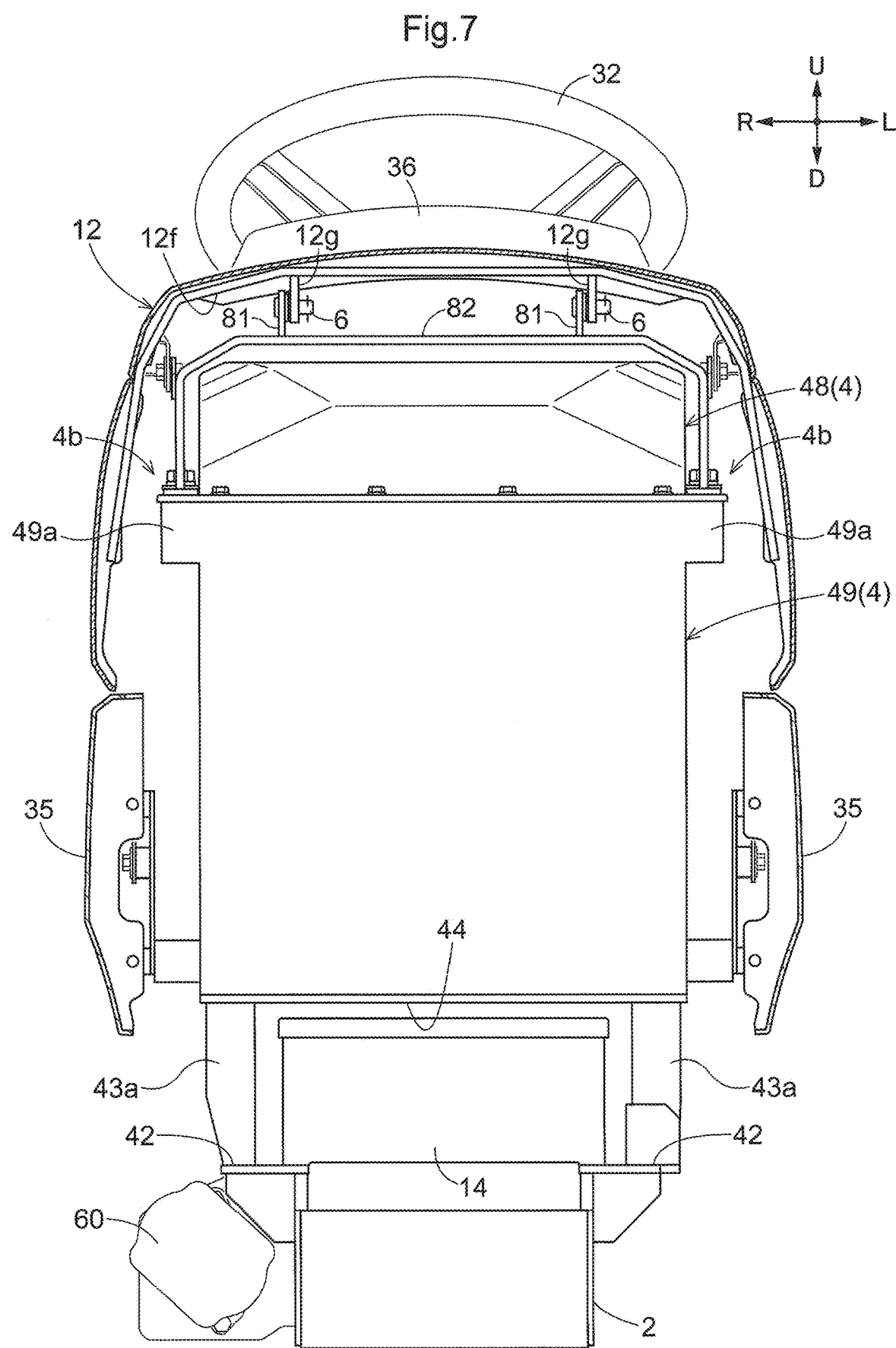
FIG. 7 is a partially cutaway front view showing configurations of a travel battery and so forth according to another preferred embodiment of the present invention.

As shown in FIG. 7, a protruding portion 49a protruding in the lateral direction of the body may be provided at an upper end portion of the lower battery portion 49. In this configuration, the stepped portion 4b is provided between the upper battery portion 48 and the protruding portion 49a. In the example shown in FIG. 7, the protruding portion 49a protrudes outward of the left and right ends of the upper battery portion 48 in the left-right direction of the body. In the example shown in FIG. 7, a portion of the lower battery portion 49 that is located below the protruding portion 49a has the same length in the left-right direction as the length of the upper battery portion 48 in the left-right direction.

The first support portion 81 may be directly supported by a side portion of the travel battery 4 without the second support portion 82 interposed therebetween.

The second support portion 82 may be attached to a portion of a side portion of the travel battery 4 other than the hanging portions 4c.

The upper end surface 4a of the travel battery 4 and the second support portion 82 may be in contact with each other. That is, the gap G need not be provided between the upper end surface 4a of the travel battery 4 and the second support portion 82.

The second support portion 82 may be attached to a portion of a side portion of the travel battery 4 other than the stepped portion 4*b*. For example, the second support portion 82 may be attached to a side surface of the travel battery 4. The stepped portion 4*b* need not be provided on a side portion of the travel battery 4.

The coupling stays 89 need not be provided. That is, the second support portion 82 and the third support portion 83 need not be coupled to each other. The third support portion 83 need not be supported by the travel battery 4.

Positions of some or all of the structural elements, portions, components, etc., may be inverted in the left-right direction.

The opening and closing axis Q need not extend in the left-right direction of the body. For example, the opening and closing axis Q may extend in the front-rear direction of the body.

Note that the configurations disclosed in the preferred embodiments described above (including the alternative preferred embodiments) are applicable in combination with configurations disclosed in other preferred embodiments so long as no inconsistency arises. The preferred herein embodiments disclosed are illustrative, and preferred embodiments of the present invention are not limited thereto. Appropriate changes and modifications may be made without departing from the scope and sprit of the present invention.

Preferred embodiments of the present invention are applicable not only to tractors, but also to various electric work vehicles such as combines, rice planters, and construction machines.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An electric work vehicle comprising:
  a battery;
  a motor to be driven by electric power supplied from the battery;
  a cover covering the battery; and
  a first support portion supported by the battery; wherein
  the cover is supported by the first support portion and is swingable about a horizontal axis relative to the first support portion to enable opening and closing; and the first support portion is supported by a side portion of the battery.

2. The electric work vehicle according to claim 1, further comprising:
  a second support portion attached to the side portion of the battery; wherein
  the first support portion is supported by the side portion of the battery via the second support portion.

3. The electric work vehicle according to claim 2, wherein the second support portion is attached to a hanging portion provided on the side portion of the battery to hang the battery.

4. The electric work vehicle according to claim 2, wherein
  the second support portion has a gate shape straddling an upper end surface of the battery;
  a lower end portion of the second support portion is attached to the side portion of the battery; and
  a gap is provided between the upper end surface of the battery and the second support portion.

5. The electric work vehicle according to claim 2, further comprising:
  a stepped portion provided on the side portion of the battery; wherein
  the second support portion is attached to the stepped portion.

6. The electric work vehicle according to claim 2, further comprising:
  an operator portion where an operator is capable of riding; and
  a third support portion provided between the operator portion and the battery; wherein
  the third support portion supports an electric component of the operator portion and is supported by the battery; and
  the second support portion and the third support portion are coupled to each other.

7. The electric work vehicle according to claim 1, further comprising:
  an operator portion where an operator is capable of riding; and
  a third support portion provided between the operator portion and the battery; wherein
  the third support portion supports an electric component of the operator portion and is supported by the battery.

* * * * *